United States Patent [19]

Ishimaru et al.

[11] Patent Number: 4,851,869
[45] Date of Patent: Jul. 25, 1989

[54] LENS DRIVING APPARATUS

[75] Inventors: Toshiaki Ishimaru; Shoji Kawamura; Shunji Matsutani, all of Hachioji, Japan

[73] Assignee: Olympus Optical Co., Ltd., Japan

[21] Appl. No.: 143,818

[22] Filed: Jan. 13, 1988

[30] Foreign Application Priority Data

Jan. 19, 1987 [JP] Japan .................................. 62-9417
Dec. 18, 1987 [JP] Japan .................................. 62-320473

[51] Int. Cl.⁴ .............................................. G03B 3/10
[52] U.S. Cl. ................................................ 354/195.1
[58] Field of Search ............ 354/400, 402, 409, 195.1, 354/195.13; 352/140; 350/255, 429

[56] References Cited

U.S. PATENT DOCUMENTS

| 3,798,517 | 3/1974 | Whitehouse | 350/429 X |
| 4,002,405 | 1/1977 | Stahl | 350/255 X |
| 4,161,756 | 7/1979 | Thomas | 350/429 X |
| 4,176,935 | 12/1979 | Smith | 354/195.1 |
| 4,417,281 | 11/1983 | Hama | 350/429 X |
| 4,445,757 | 5/1984 | Eromoto et al. | 350/429 |
| 4,446,526 | 5/1984 | Iwanade | 350/429 X |
| 4,568,165 | 2/1986 | Ishibushi | 354/195.1 |

FOREIGN PATENT DOCUMENTS

| 2940312 | 4/1980 | Fed. Rep. of Germany | 340/429 |
| 194005 | 11/1983 | Japan | 340/429 |
| 110 | 1/1984 | Japan | 354/400 |
| 176415 | 11/1985 | Japan | 354/400 |
| 36619 | 2/1987 | Japan | 354/400 |

Primary Examiner—W. B. Perkey
Attorney, Agent, or Firm—Louis Weinstein

[57] ABSTRACT

A power focusing apparatus, while a rotary operating member is rotated calculates a motor driving speed in accordance with a rotating speed of the operating member or calculates an amount of driving the motor in accordance with a speed and an amount of rotating the operating member and drives a lens with the calculated speed or amount of driving the motor.

40 Claims, 15 Drawing Sheets

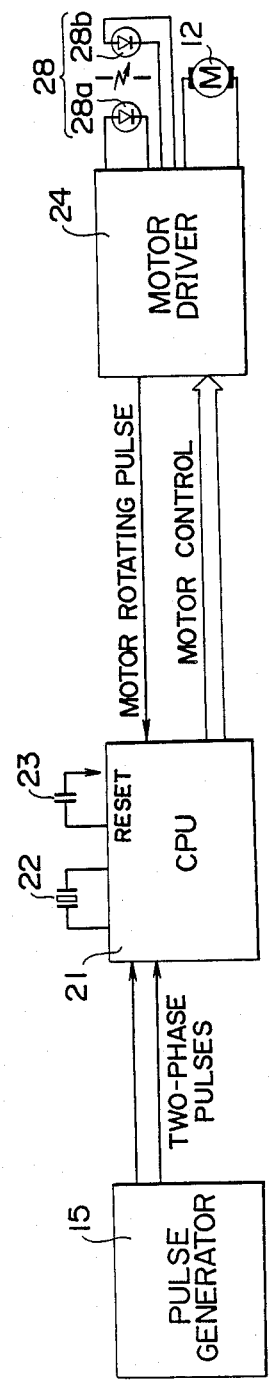
F I G. 3

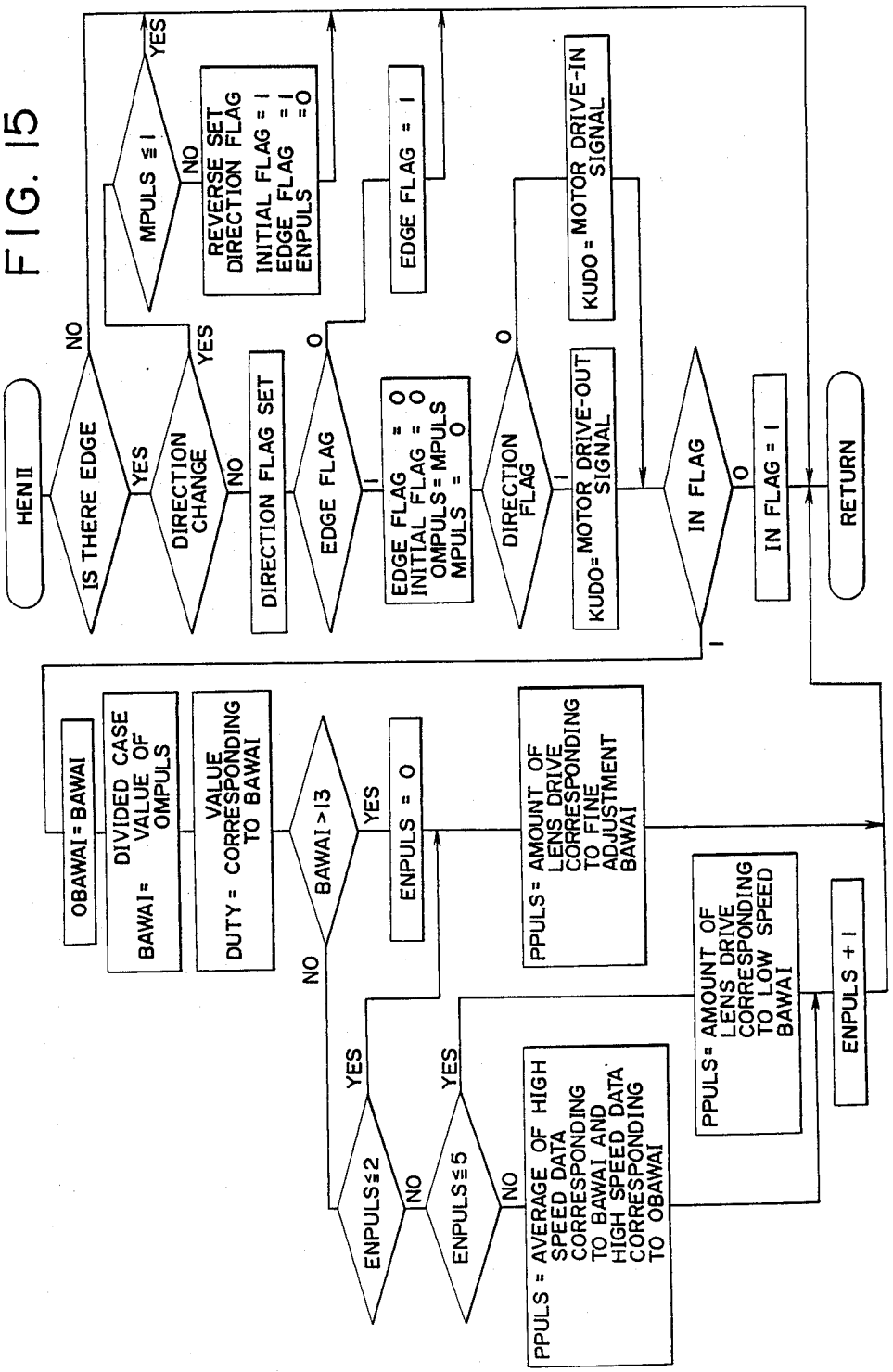

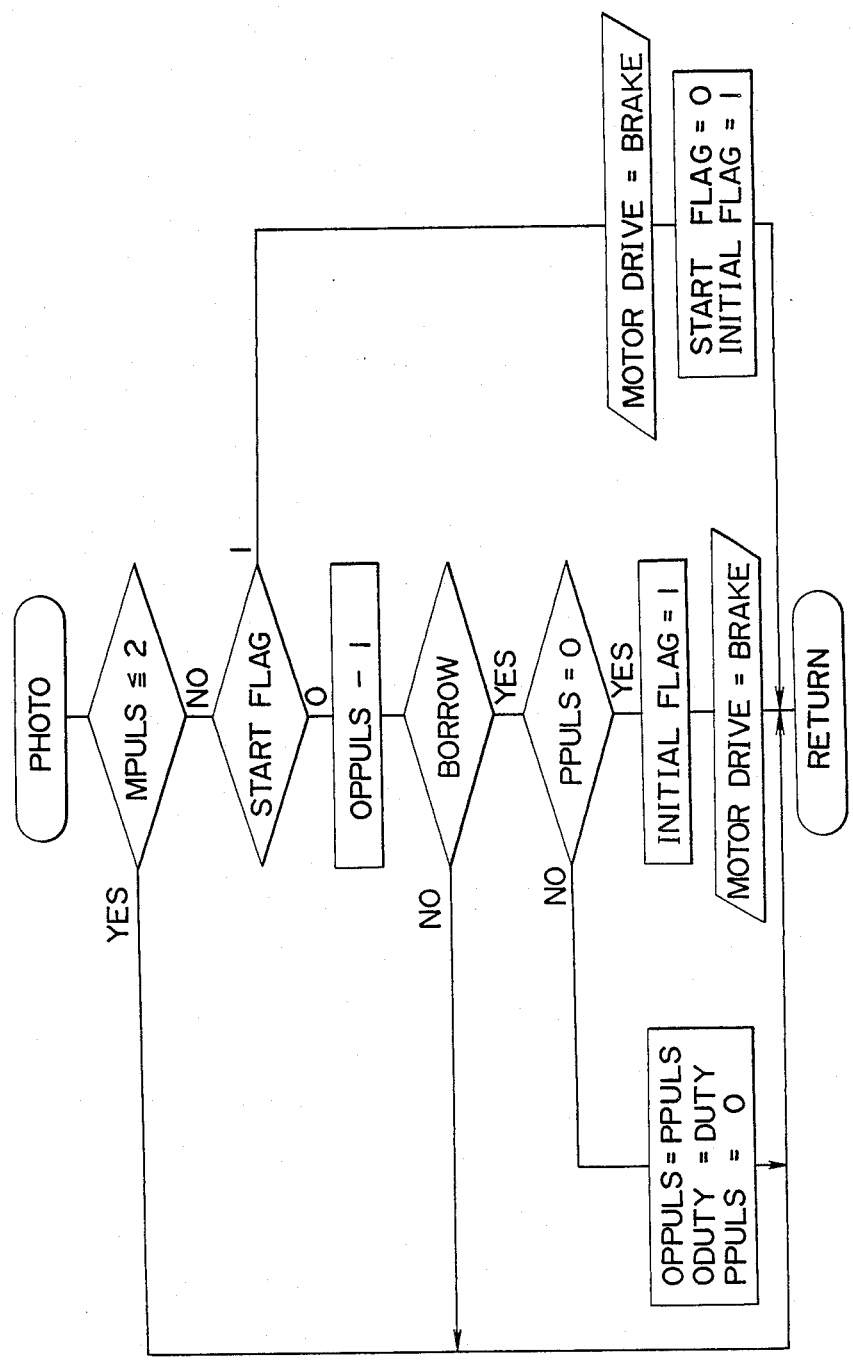

LENS DRIVING APPARATUS

FIELD OF THE INVENTION AND RELATED ART STATEMENT

The present invention relates to a power focusing apparatus, and more particularly, to a power focusing apparatus which moves a taking lens with the driving power of a motor by operating an operating member for focusing.

Recently, a power focusing apparatus has been employed for an auto-focusing (hereinafter referred to as AF) single-lens reflex camera and an interchangeable lens having the AF function as an auxiliary function for AF. In this case, an operating member for power focusing includes two push-button switches which positively determine a direction and a speed of driving a taking lens respectively (for example, Japanese Laid Open Patent Application No. Sho 59-64816). Alternatively, the present applicant has proposed a power focusing apparatus in which an operating member for power focusing is formed in a loop and two kinds of speeds of driving a taking lens are provided (Japanese Patent Application No. Sho 60-271747).

In a conventional power focusing apparatus, since only one driving speed of a motor for driving a taking lens is determined to a single state of a push button switch as described above, it is time-consuming to drive the lens from a point at infinity to a close point when a driving speed is set by giving priority to fine adjustment in focusing. Conversely, when a driving speed is set by giving priority to coarse adjustment in focusing, it is difficult to make a fine adjustment. In order to meet both fine and coarse adjustments, it is necessary to set a variety of driving speeds to a motor for driving a taking lens. To this end, it is necessary to provide a number of switches which respectively correspond to a variety of speeds for driving-in and-out a taking lens, resulting in increase in cost and space.

SUMMARY OF THE INVENTION

It is an object of the present invention to provide a power focusing apparatus which is capable of easily driving a taking lens at a speed in fine adjustment to a high speed with an operating member for power focusing without a delay in feeling to operation of a photographer.

It is another object of the present invention to provide a power focusing apparatus which is capable of precisely and rapidly focusing a taking lens, using a multi-rotatable rotary operating member as an operating member, with a feeling similar to that in focusing with a range ring rotating type.

It is a further object of the present invention to provide a power focusing apparatus which determines a direction of driving a taking lens in response to a direction of an operating member.

It is a still further object of the present invention to provide a power focusing apparatus which determines an amount of driving a taking lens in response to an operating speed or an operating speed and amount of operation of an operating member.

(1) According to the present invention, since a taking lens is driven at a speed in fine adjustment to a high speed with an operating member for power focusing, it is possible to drive the lens without a delay in feeling to operation of a photographer.

(2) According to the present invention, focusing can be accurately and rapidly effected by using a multi-rotatable rotary operating member with a feeling similar to that in focusing with a range ring rotating type.

(3) According to the present invention, a taking lens can be driven at an increased moving speed and amount with an increased operating speed of the operating member and at a reduced moving speed and amount with a reduced operating speed, in accordance with an operating speed of the operating member, thus enabling the taking lens to be driven very smoothly.

(4) According to the present invention, since an amount of movement of a taking lens is determined by an operating speed as well as an operating amount, it is possible to smoothly drive the lens during fine adjustment even when an operating speed varies to some degree without straining the photographer's nerves to even a slight change in speed of his fingers and hand, resulting in focusing operation that can be performed with a good operational feeling.

BRIEF DESCRIPTION OF THE DRAWINGS

FIG. 3 is a schematic diagram of an electric circuit of the power focusing apparatus shown in FIG. 2;

FIGS. 14 to 16 are explanatory flow charts of programmed operations of a CPU in use for the power focusing apparatus shown in FIG. 13.

DETAILED DESCRIPTION OF PREFERRED EMBODIMENTS

A power focusing apparatus of the present invention, which takes the place of a conventional manual focusing apparatus for focusing a taking lens by manually turning a range ring thereof, can be applied as a supplementary means for a camera and an interchangeable lens having an AF function but will be herein described regarding the case where it is applied to a manually operable focusing camera not having an AF function.

Figure 1:
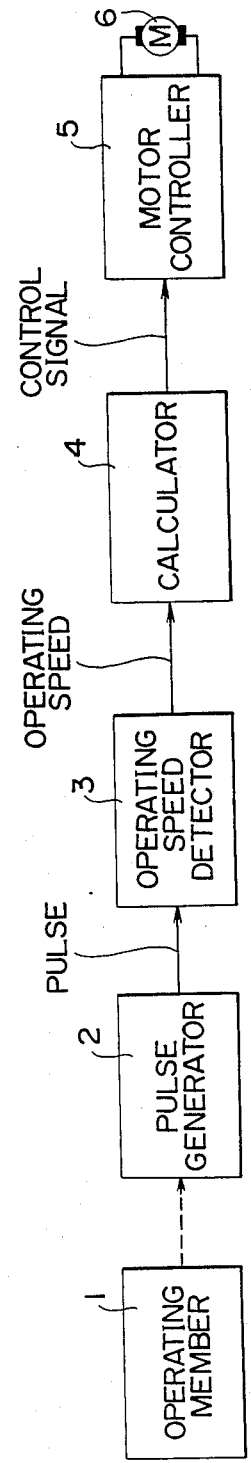
FIG. 1 is a block diagram showing a basic concept of a first embodiment of a power focusing apparatus according to the present invention.

In FIG. 1, a power focusing apparatus of the present invention comprises an operating member 1 which is manually movable, a pulse generator 2 which generates pulses as the operating member 1 is operated, an operating speed detector 3 which detects an operating speed of the operating member 1 in response to pulses from the pulse generator 2, a calculator 4 which determines a control signal for driving a motor on the basis of the determined operating speed, a motor controller 5 which produces a motor drive current in response to the control signal from the calculator 4, and a motor 6 for driving a taking lens to focus it. When the operating member 1 is moved by a manual operation, a control signal from the calculator 4 is delivered in accordance with the operating speed of the operating member 1 to the monitor controller 5 to drive a taking lens by means of the motor 6 with a speed corresponding to the operating speed of the operating member 1. While it is preferred to employ a rotary member as the operating member 1, it is not limited to a rotary member.

Figure 2:
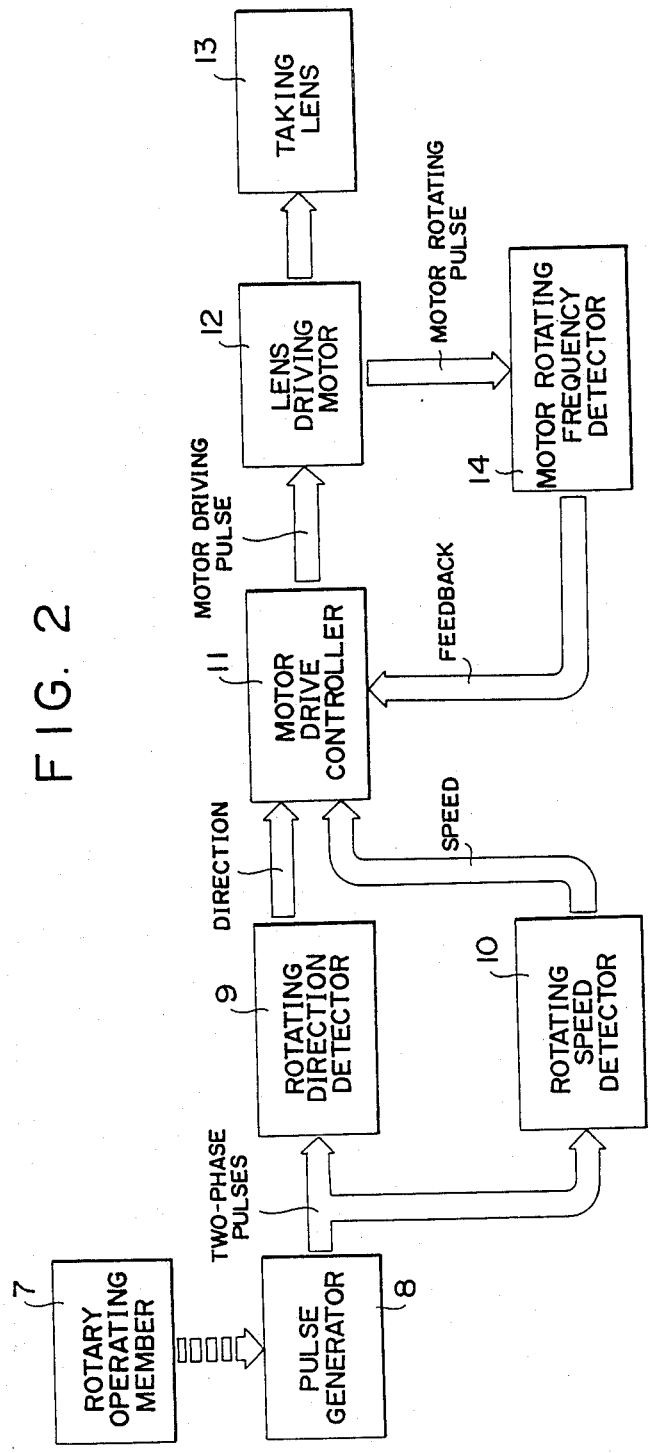
FIG. 2 is a block diagram of the further detailed power focusing apparatus shown in FIG. 1.

In FIG. 2, two-phase pulses whose phases are different from each other are produced from a pulse generator 8 in response to rotation of a rotary operating member 7 which is an operating member for the power focusing operation and is provided on a camera body or a part of an interchangeable lens. The two-phase pulses are delivered to a rotating direction detector 9 and a rotating speed detector 10. When receiving the two-phase pulses, the rotating direction detector 9 detects a rotating direction of the rotary operating member 7 based on phases of the two-phase pulses. When receiving the two-phase pulses the rotating speed detector 10 detects a rotating speed of the rotary operating member 7 based on frequency or pulse width of the two-phase pulses. Information of the rotating direction and speed thus obtained is delivered to a motor drive controller 11. The motor drive controller 11 delivers pulses for driving a motor corresponding to the information of the rotating direction and speed to a motor 12 for driving a taking motor and determines a duty ratio of a current for driving the motor 12. Thus the speed of moving a taking lens 13 is determined in accordance with the duty ratio of the driving current. Pulses produced by rotation of the motor 12 are delivered to a motor rotating frequency detector 14 to be detected as a frequency of rotating the motor 12 which is fed into the motor drive controller 11 as feedback information.

Figure 4:
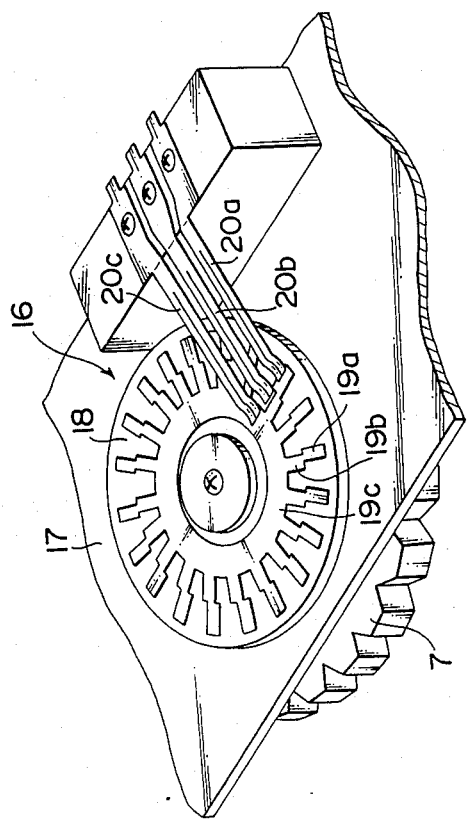
FIG. 4 is a perspective view showing a structure of an encoder switch in a pulse generator shown in FIG. 3.

In FIG. 3, a pulse generator 15 corresponds to the pulse generator 8 shown in FIG. 2 and practically includes an encoder switch 16 shown in FIG. 4. The encoder switch 16 comprises a rotary plate 18 provided on a camera body or a stationary member 17 on an interchangeable lens so as to be rotatable in interconnection with the multi-rotatable rotary operating member 7 and three lead contact pieces 20a, 20b, 20c fixedly arranged on the stationary member 17 so as to be respectively in slidingly contact with three conductors 19a, 19b, 19c forming a conductor pattern provided on the rotary plate 18.

Two outside conductor 19a, 19b of the three conductors 19a, 19b, 19c are formed such that they are equidistant circumferentially of the rotary plate 18 and are shifted in relation to each other in phase. The remaining inside conductor 19c is a common conductor electrically connected to the two conductors 19a, 19b and continuously formed circumferentially of the rotary plate 18. When the operating member 7 is manually operated to rotate, the rotary plate 18 also rotates in at the same direction and at the same speed as those of the operating member 7. When a steady-state electric signal is applied between first and second lead contact pieces 20a, 20b which are respectively in contact with the conductors 19a, 19b and the third lead contact piece 20c which is in contact with the common conductor 19c, pulse signals whose phases are shifted to each other are respectively derived from first and second lead contact pieces 20a, 20b. The two conductors 19a, 19b are formed such that their conducting parts and non-conducting parts are the same in width. Accordingly, while the operating member 7 rotates with a constant speed, an interval at an "H" level from the leading edge to the trailing edge and an interval of an "L" level from the trailing edge to the leading edge of the pulse signals from the lead contact pieces 20a, 20b are the same. The two-phase pulse signals are delivered to a CPU 21 (central processor unit).

The CPU 21 detects a rotating direction of the operating member 7 from a phase difference between the two-phase pulse signals fed thereinto and calculates a rotating speed of the operating member 7 from a frequency or a width of the pulse signals. The CPU 21 determines a duty ratio of a motor driving current by the calculated rotating speed and delivers a motor control signal of the detected direction, normal or reverse rotation, together with the duty ratio. In other words, the CPU 21 performs the function of the rotating speed detector 3 and calculator 4 and has a part of functions of the rotating direction detector 9, rotating speed detector 10 and motor drive controller 11. The CPU 21 determines a duty ratio and at the same time calculates an output pulse frequency of the rotating speed detector 10 corresponding to a rotating speed of the motor 12 and the number of pulses corresponding to an amount of rotating the motor 12. In FIG. 3, a clock generator 22 and a reset capacitor 23 are connected to the CPU 21.

Figure 5:
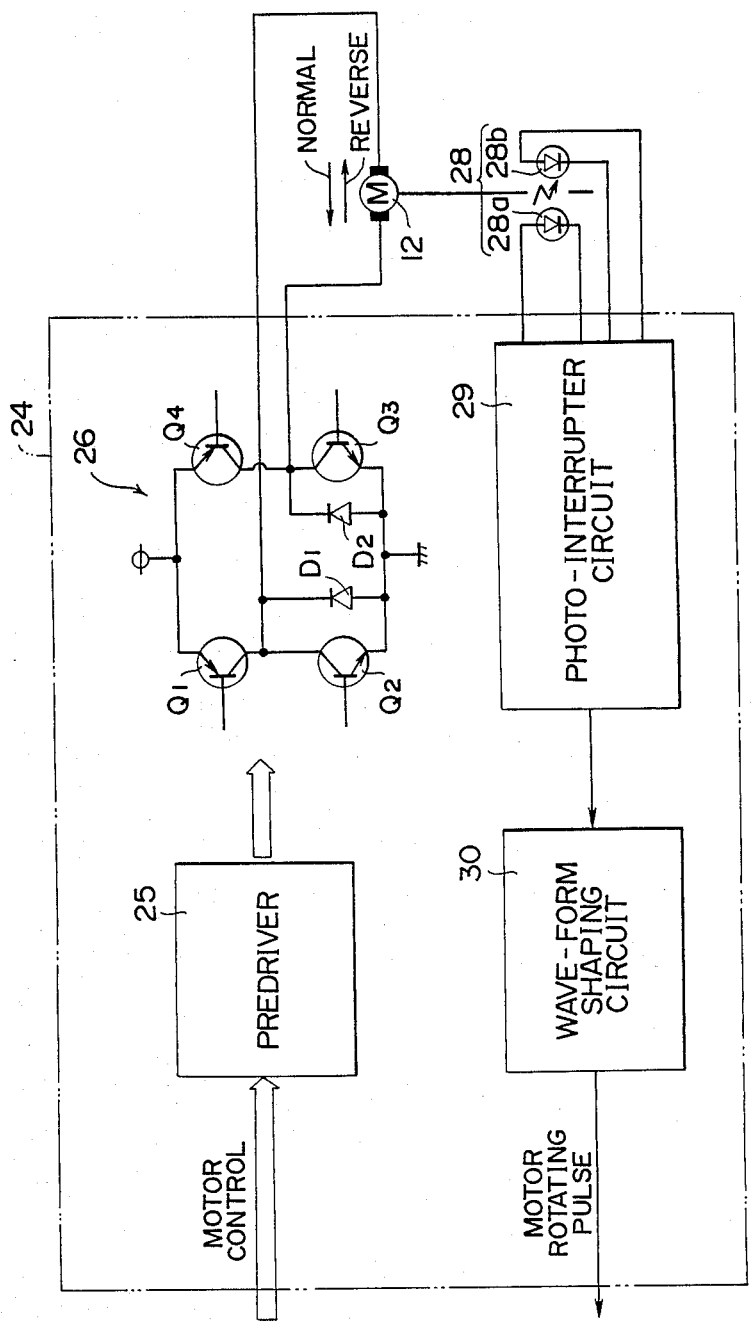
FIG. 5 is a schematic circuit diagram showing a structure of a motor driver shown in FIG. 3.

A motor driver 24, as shown in FIG. 5, comprises a pre-driver 25 for receiving a motor control signal from the CPU 21, a motor bridge circuit 26 for driving the motor 12, a photo-interrupter circuit 29 for driving a photo-interrupter 28 including a light emitter 28a and a light receiver 28b with a slit plate which is in cooperation with rotation of the motor 12 and which is interposed therebetween and for processing an output from the photo-interrupter, and a wave-form shaping circuit 30 for shaping an output of the photo-interrupter circuit 29.

The motor bridge circuit 26 comprises transistors $Q_1$ to $Q_4$ and diodes $D_1$ and $D_2$. When the transistors $Q_1$ and $Q_3$ are on and the transistors $Q_2$ and $Q_4$ are off, the motor 12 rotates normally. When the transistors $Q_2$ and $Q_4$ are on and the transistors $Q_1$ and $Q_3$ are off, the motor 12 rotates reversely. In addition, when the transistors $Q_1$ and $Q_4$ are off and transistors $Q_2$ and $Q_3$ are on, a brake is applied to the motor 12 to stop it. When all the transistors $Q_1$ to $Q_4$ are off, no current flows through the motor bridge circuit 26 (this condition is hereinafter referred to as an open state). The photo-interrupter circuit 29 operates the photo-interrupter 28 and, when the motor 12 rotates, delivers pulses of a frequency corresponding to a rotating speed of the motor 12 to the wave-form shaping circuit 30. The shaped pulses for rotating the motor from the shaping circuit 30 are fed back to the CPU 21.

Operation of the above embodiment will be described with reference to FIGS. 6 to 12.

Figure 6:
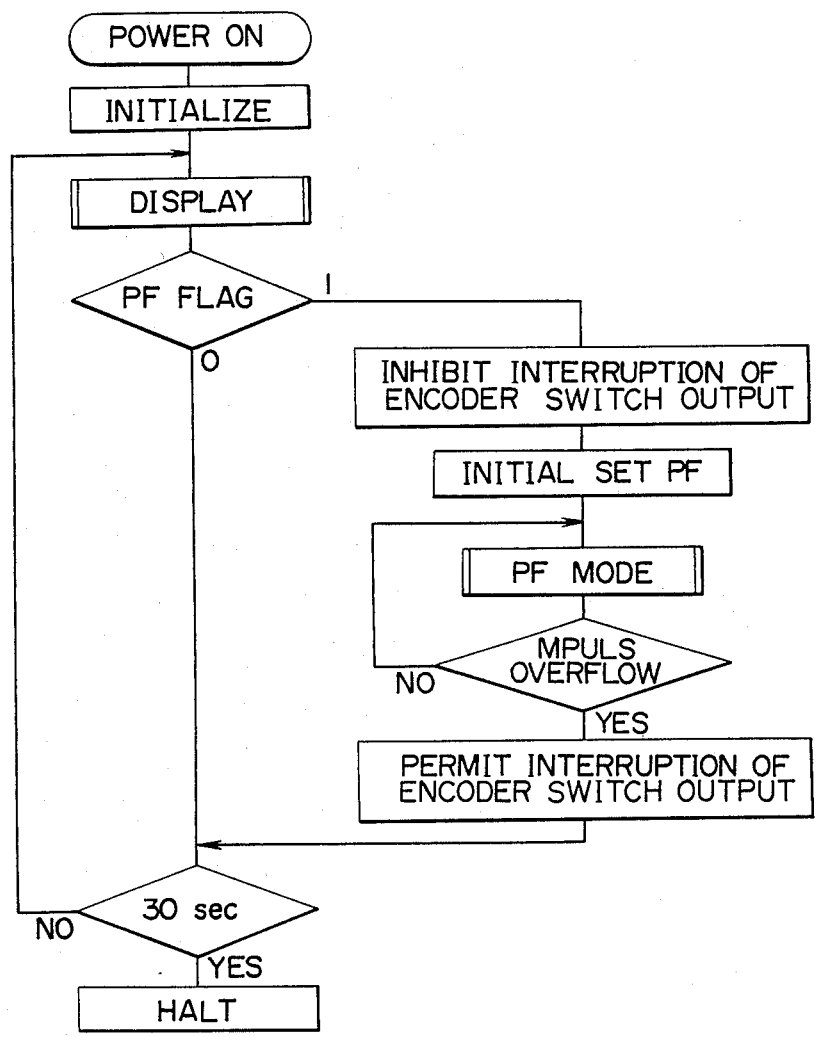
FIG. 6 to 12 are explanatory flow charts of programmed operation of a CPU shown in FIG. 3.

When a power is applied to a camera or an interchangeable lens, in power routine shown in FIG. 6, operations such as clearing a PF flag, setting an initial flag, resetting a memory and the like which will be described later, are first initialized. A <display> routine for displaying a photometric value and the like is then conducted. When no PF flag is set, the <display> routine is repeated for 30 sec. After 30 sec., the <POWERON> routine halts.

Figure 7:
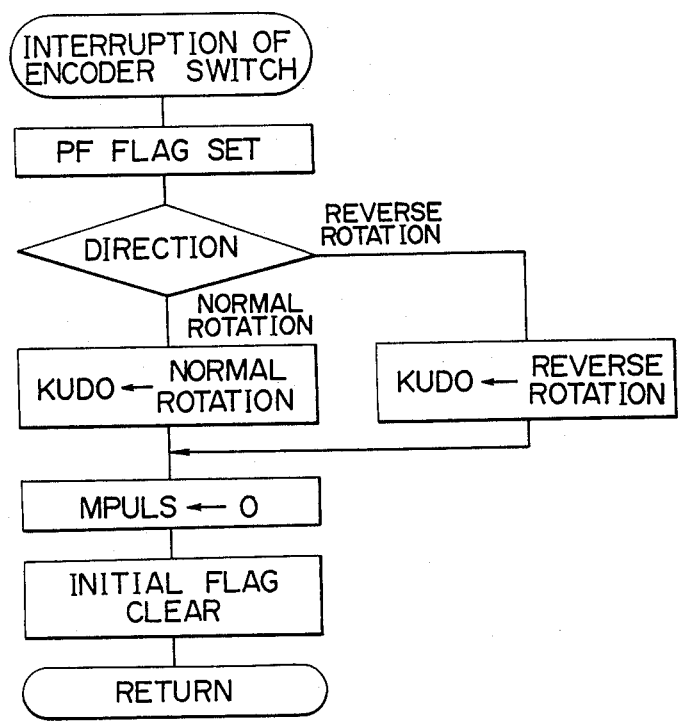

Here, the PF flag is set when the encoder switch 16 which is operated by the rotary operating member 7 produces its output. Namely, in the <display> routine (whose description will be omitted), an output of the encoder switch 16 is interrupted, as shown in FIG. 7, the PF flag is first set to decide a rotating direction of the rotary operating member 7 by the two-phase pulses from the encoder switch 16. Based on the decided direction, KUDO which is a memory of a motor control signal to the motor bridge circuit 26 is rotated in a normal or reverse direction. Subsequently, after zero is inputted into MPULS the initial flag is cleared. The MPULS, which is memory representing a rotating speed of the rotary operating member 7, is composed of an 8-bit counter for detecting a rotating speed of the encoder switch 16 and represents the number of pulses which are counted in every loop of a <PFMODE>-subroutine which will be described later during an interval of time corresponding to a width of one of the two-phase pulses which are produced by rotation of the rotary operating member 7. Namely, in this embodiment, a time required in a <PFMODE> routine which will be described later is utilized in the counting of the MPULS. When the PF flag is set the flow returns to the <POWERON> routine shown in FIG. 6. At the time of the subsequent PF flag check the CPU 21 branches off from the <display> routine to a <power focusing> routine.

In the <power focusing> routine, the interruption of the encoder switch 16 is inhibited and a PF mode is initialized. The initialization is to input values required to each of the memories when starting. Specifically, OPEN which indicates the open condition of the motor bridge circuit 26 is entered into a memory WAIT and values 50, 4 and 50, for example, are inputted into a memory Duty, memory PPULS and memory PTIME respectively. The roles of these memories will be described later.

Subsequently, a <PFMODE> subroutine is performed to repeat it until the MPULS overflows. When the MPULS overflows, deciding that the rotary operating member 7 is stopping, the flow passes through the <PFMODE> to return to the <display> routine permitting interruption of the encoder switch 16.

Figure 10:
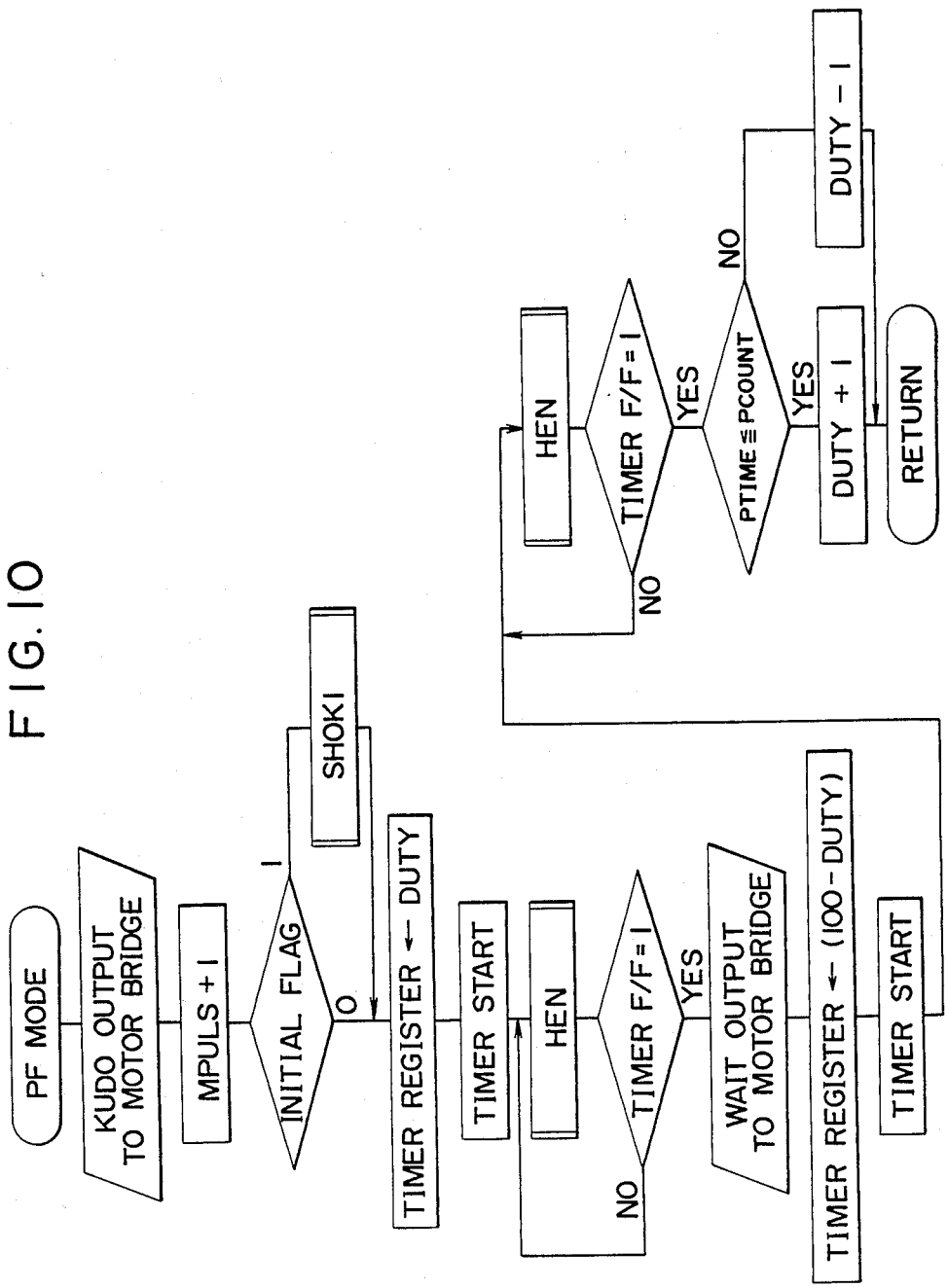

In the <PFMODE> subroutine, as shown in FIG. 10, KUDO is first given to the motor bridge circuit 26. As described above, KUDO is a memory of a control signal when the motor 12 is driven with pulses and has four kinds of memories, a normal rotation, reverse rotation, BRAKE (a braking condition) and OPEN. After 1 is added to MPULS, an initial flag is checked. The initial flag is a flag which is set at the time of the motor stop during an <interruption of the photointerrupter> routine (see FIG. 8) which will be described later. When the initial flag is raised, a <SHOKI> subroutine is performed.

Figure 11:
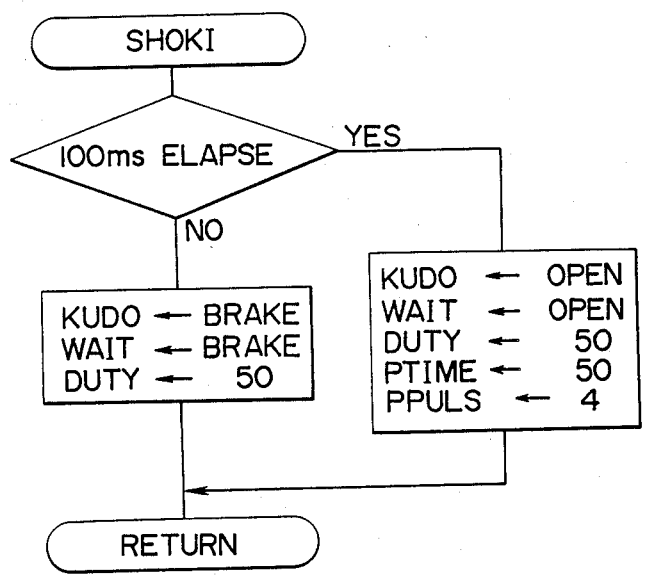

In the <SHOKI> subroutine, as shown in FIG. 11, KUDO and WAIT are made BRAKE and DUTY is made 50 until time goes by 100 msec (4 loops as one loop is for 25 msec). After the lapse of 100 msec, KUDO and WAIT are made OPEN and values 50, 50 and 4 are entered into the DUTY, PTIME and DPULS respectively. Here, WAIT is a memory of no power supply signal to the motor 12 when the latter is driven with pulses and has two kinds of memories, BRAKE and OPEN. PTIME and PPULS will be described later.

Thereafter, the DUTY is entered into a timer register. The DUTY represents a duty ratio of a motor drive current which is calculated based on a rotating speed of the encoder switch 16. When starting the DUTY is set to the value 50 and then is calculated in accordance with MPULS as will be described later. After the DUTY is entered into the timer register, a timer starts. A <HEN> subroutine which will be described later is repeated until a timer F/F becomes 1, that is, until a time corresponding to the DUTY is measured. When the timer F/F reaches 1, WAIT is delivered to the motor bridge circuit 26. The WAIT, which is normally in BRAKE, is in OPEN after the lapse of 100 msec with the initial flag set (see FIG. 11).

Subsequently, (100-DUTY) is inputted into the timer register to restart the timer. Similarly, the <HEN> subroutine is repeated until the timer F/F reaches 1, that is, a time corresponding to the (100-DUTY) is measured. When the timer F/F reaches 1, PTIME and PCOUNT are compared.

Now, the meaning of the comparison of PTIME and PCOUNT will be described. The PTIME is set to 50 when starting and thereafter is calculated in accordance with MPULS as will be described later. Namely, the PTIME indicates a speed at which the motor is driven in accordance with the MPULS. the PCOUNT, as shown in FIG. 9, is a memory into which a value of COUNT which is added by an increment 1 at every output of a time I in the CPU 21 are inputted in an < interruption of a photo-interrupter> routine (FIG. 8) and corresponds to a pulse interval from the photo-interrupter 28.

Interchangeable lenses each have their own different drive loads and even when a motor is driven with the same duty ratio a speed of driving the motor will vary with effects of variation in a power voltage. Consequently, in this embodiment, PTIME is set to a value corresponding to a speed of the motor to be driven by MPULS corresponding to a rotating speed of the rotary operating member 7. It is detected whether the speed of the motor is more or less than a given one by comparing the PTIME with the PCOUNT which corresponds to an output of the photo-interrupter 28. When PTIME>PCOUNT, the subsequent duty ratio is reduced by subtracting 1 from the DUTY. When PTIME≦PCOUNT, the subsequent duty ratio is increased by adding 1 to the DUTY.

The <PFMODE> subroutine takes about 2.5 msec from its calling to return (using a timer built-in the CPU21). A drive current is given with (DUTY) % of 2.5 msec and a brake is given with (100-DUTY) %.

The method for counting the encoder switch 16 is to add an increment of 1 to the MPULS whenever the <PFMODE> subroutine is performed one time, by using 2.5 msec as a clock.

Figure 12:
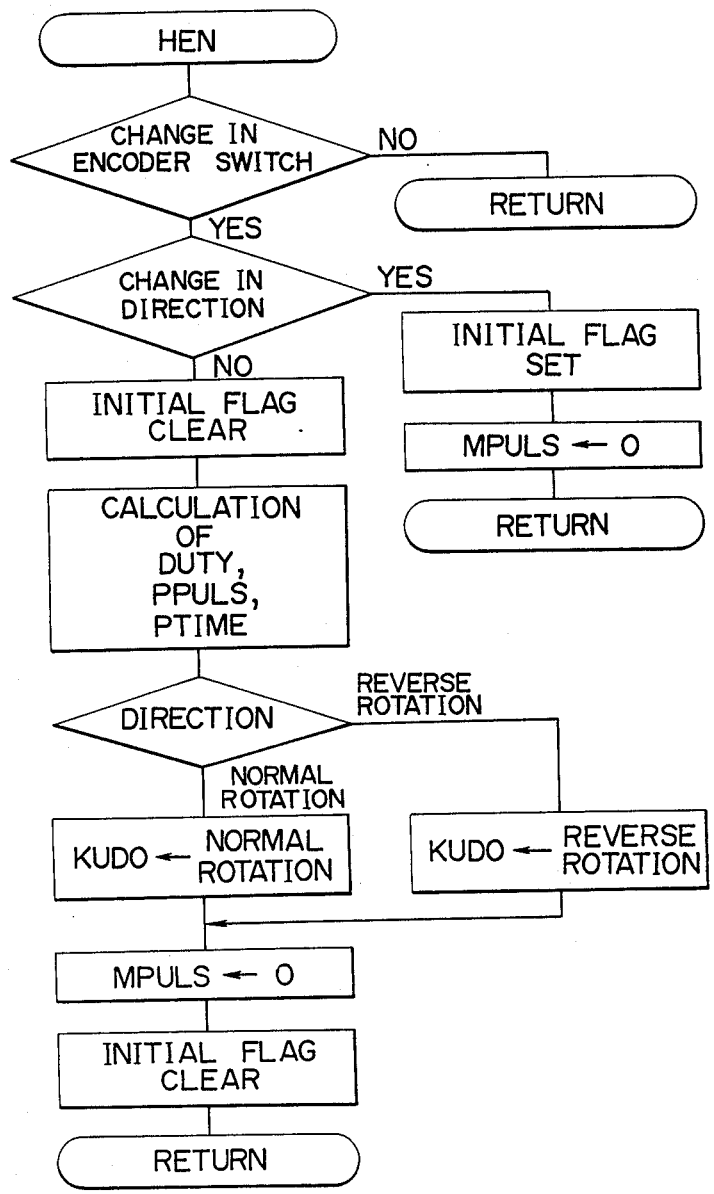

A subroutine <HEN>, as shown in FIG. 12, first checks whether there is a change in the encoder switch 16. When there is no change, it returns and when there is a change, checks whether the rotary operating member 7 has rotated in a direction different from that in the last time member 7 was checked. When the direction is different, after an initial flag is set and MPULS is cleared, the flow returns. When there is no change in direction, DUTY, PPULS and PTIME are calculated after the initial flag is cleared. At this time, the DUTY is determined by a given relationship with the MPULS such that the DUTY is reduced when the MPULS is increased, and vice versa.

Here, the PPULS has been set to 4 at the starting time and thereafter is determined by calculation in accordance with the MPULS. Namely, the PPULS indicates how much the motor is to be driven in accordance with the MPULS and is subtracted by a decrement of 1 upon every rising pulse from the photo-interrupter 28. (Details will be described later with reference to the flow chart shown in FIG. 8).

Subsequently, a rotating direction of the rotary operating member 7 is detected based on the two-phase pulses from the encoder switch 16 to be inputted into KUDO. After 0 is entered into the MPULS and the initial flag is cleared, the flow returns.

Figure 8:
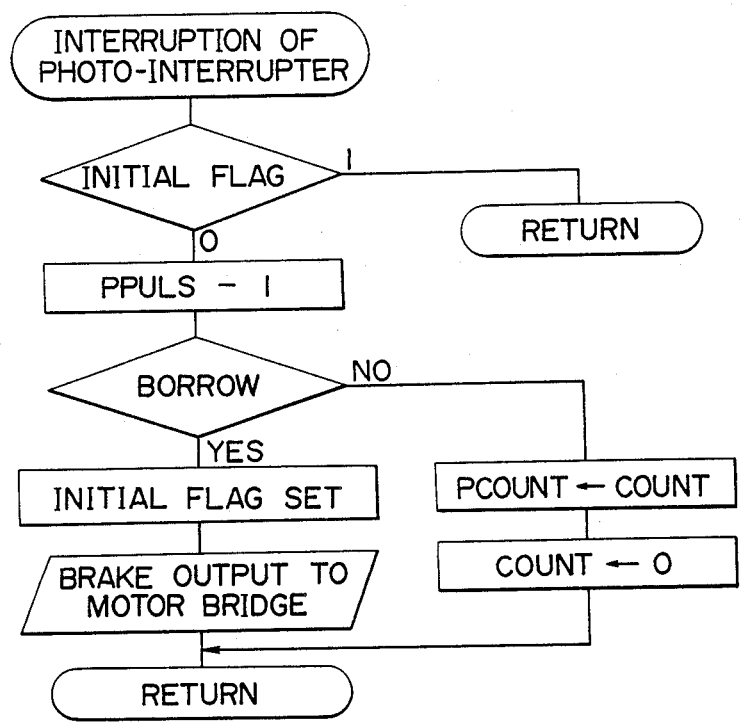
Figure 9:
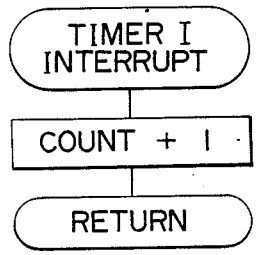

In FIG. 8, which shows a routine <interruption of the photo-interrupter>, an initial flag is examined and when the initial flag has been set the flow returns as it is assuming that interruption of the photo-interrupter occurs due to an exterior force such as play. When the initial flag has not been set, the PPULS which is calculated in the subroutine <HEN> (FIG. 12) is subtracted by a decrement of 1. At this time, when there is no borrow COUNT is transferred to PCOUNT and the COUNT is cleared and then the flow returns. When there is borrow, after the CPU 21 sets the initial flag deciding that the motor 12 has been driven by a value calculated by the CPU 21, the CPU 21 delivers BRAKE to the motor bridge circuit 26 and returns. Namely, whenever an interruption from the photo-interrupter occurs, the PPULS is subtracted by a decrement of 1 and the motor 12 is driven until borrow occurs, that is, until the motor 12 is driven with the calculated PPULS.

As thus far described, in the above embodiment, it is possible to drive a taking lens at any speed from fine adjustment to coarse adjustment by operating a single rotary operating member and to control the drive with the resolution of one pulse from the photo-interrupter in fine adjustment, that is, with a minimum amount of movement of lens, even when a power voltage or load torque varies. In addition, it is possible to make a speed of moving a lens constant irrespective of a power voltage and load torque of the taking lens.

Further, while the rotary encoder switch of the electric contact type as shown in FIG. 4 is employed as a pulse generator in the above embodiment, an optical rotary encoder and a magnetic encoder may be used as a two-phase pulse generator. In addition, it is possible to detect a rotating speed and direction by using a single-phase pulse generator and a mechanical switch which turns on when being rotated in one direction and turns off when being rotated in the other direction.

Further, in the above embodiment, while the number of pulses and a frequency of an output from the photo-interrupter are fed back, only the number of counts or a frequency of an output from the photo-interrupter may be fed back.

Still further, while a DC motor control is employed in the above embodiment, no feed-back from the photo-interrupter is required when a stepping motor is employed.

Another embodiment of the present invention will now be described hereinafter.

In the first embodiment described above, it is necessary to reduce a rotating speed of the rotary operating member 7 during the fine adjustment. Accordingly, it takes time for the fine adjustment and a nervous operation is required because fingers must be moved slowly. On the other hand, when a photographer manually performs a focusing operation as by rotating a range ring, the fine adjustment is usually initiated after once stopping or with a very slow rate or with a change in direction of rotation of the range ring, after the range ring has been rapidly brought into the neighborhood of the in-focus position.

Figure 13:
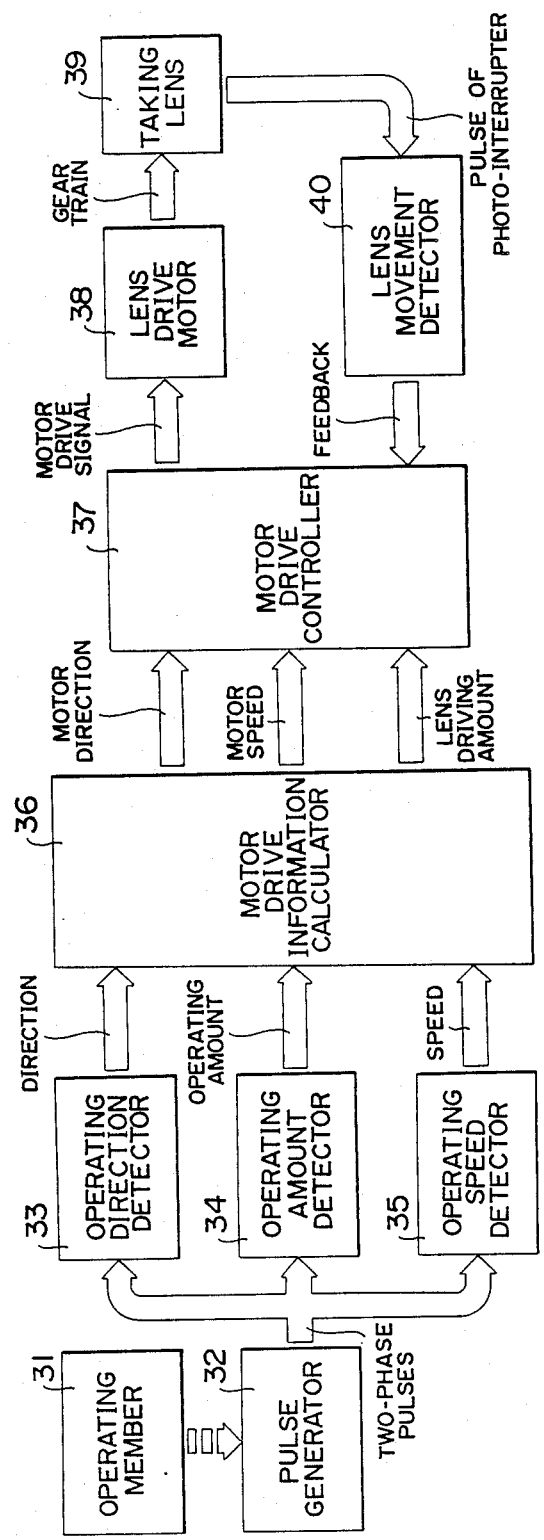
FIG. 13 is an explanatory block diagram of the outlines of a second embodiment of a power focusing apparatus according to the present invention.

In view of the foregoing, a second embodiment of a power focusing apparatus shown in FIG. 13 is designed according to the present invention so as to make the fine adjustment more rapid and easy. In order to realize functions of a camera, it is essential to process an exposure, rewinding and the like.

In the second embodiment, however, only a power focusing function will be described omitting other functions.

The power focusing apparatus shown in FIG. 13 generates two-phase pulses whose phases are different from each other in response to an operation of an operating member 31 provided on a camera body, a part of an interchangeable lens or a remote control apparatus. When the two-phase pulses are delivered to an operating direction detector 33, amount of operation detector 34 and operating speed detector 35, the operating direction detector 33 detects information of an operating direction of the operating member 31 by a difference in phase of the two-phase pulses, the amount of operation detector 34 detects information of an amount of operation of the operating member 31 by the number of at least one of the two-phase pulses and the operating speed detector 35 detects information of an operating speed of the operating member 31 by an edge width of at least one of the two-phase pulses (a time width from a leading edge to a trailing edge of the pulse or from a trailing edge to a leading edge of the pulse). While the three operation information respectively correspond to a direction, amount and speed of rotation when the operating member 31 is a rotary member, it is unnecessary to particularly employ a rotary member as long as the operating member 31 is the one producing two-phase pulses whose phases are different from each other. The three operation informations are delivered to a motor drive information calculator 36.

In the motor drive information calculator 36, three motor drive informations for a drive control of a motor 36 for driving a taking lens and a direction, speed and amount of driving the motor 36, are calculated in an arithmetical or a matrix table manner from the three operation informations. When receiving the three motor drive informations, the motor drive controller 37 delivers a motor drive signal to the motor 38 including a motor drive circuit. A taking lens 39 moves as the motor 38 rotates and lens movement pulses in one-to-one correspondence with the movement of the lens 39 are delivered to a lens movement detector 40, which is fed to the motor drive controller 37 as feed-back information to be compared with the amount of driving motor information. When the movement of the lens 39 is linear to the movement of the motor 38, since the lens movement information corresponds to driving time period of the lens 39, substituting the lens movement information for the motor driving time period in FIG. 13, a feed-back system from the lens 39 to the motor drive controller 37 can be removed, thereby the circuit structure is simplified with the same effects.

The functions and operations of the second embodiment shown in FIG. 13 will be described hereinafter with reference to FIGS. 14 to 16.

In order to realize the functions of the power focusing apparatus shown in FIG. 13, the operating direction detector 33, operating amount detector 34, operating speed detector 35, motor drive information calculator 36, motor drive controller 37 and lens movement detector 40 are constructed by software within a central processing unit CPU. The embodiment shown in FIGS. 14 to 16, which are flow charts for showing operations of the CPU, employs also a multi-rotatable rotary operating member such as a dialing type operating disc mounted on a camera body or an operating ring disposed on a lens barrel, as the operating member 31.

Figure 14:
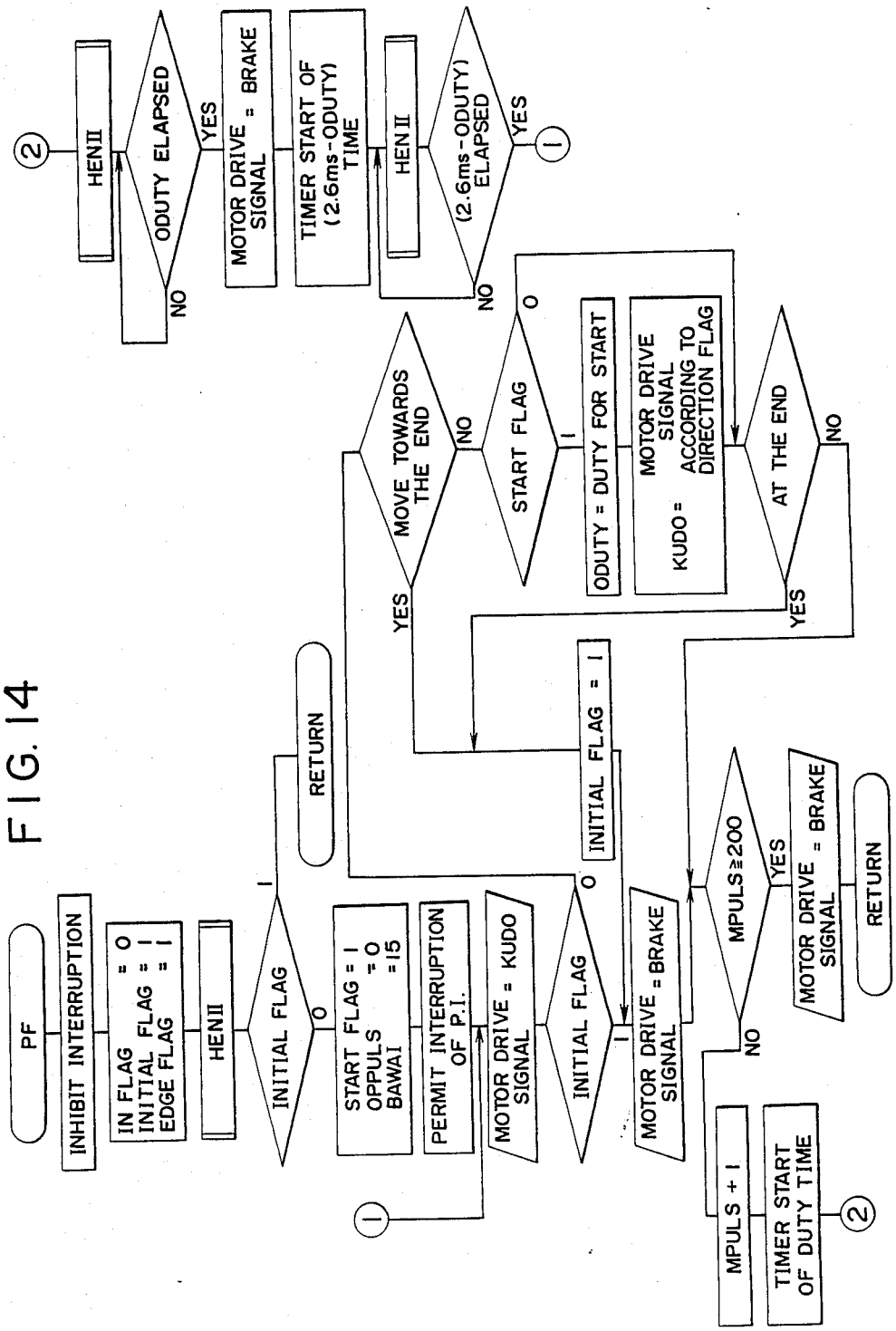

A flow diagram <PF> shown in FIG. 14 is the entire flow of the power focusing apparatus and includes the function of the motor drive controller 37. A flow diagram <HEN II> shown in FIG. 15 is a subroutine which is called in the flow diagram <PF> shown in FIG. 14 and includes the functions of the operating direction detector 33, operating amount detector 34, operating speed detector 35 and motor drive information calculator 36. In addition, a flow diagram <PHOTO> shown in FIG. 16 is provided to handle interruption occurring whenever a pulse from a photo-interrupter which is produced in response to the movement of the taking lens 39 is inverted and includes the function of the lens movement detector 40.

In operation, when the operating member 31 is manually rotated, a state of two-phase pulses generated by the pulse generator 32 varies and an interruption occurs by edges of the pulses to enter a program for power focusing. In FIG. 14, the routine <PF> shown in after all other interruptions are inhibited, an in flag, initial flag and edge flag are set to 0, 1 and 1 respectively.

Thereafter, in the subroutine <HEN II>, a direction flag which represents operating direction information is set by detecting an operating direction of the operating member 31 as will be described later and a motor drive signal is set to a variable KUDO. When the flow returns from the routine <HEN II>, the initial flag is checked. When chattering happens, since the initial flag remains as it is at 1 also in the routine <HEN II>, the flow returns and leaves from the flow <PF>. When no chattering happens, the initial flag assumes 0 in the routine <HEN II>, so that thereafter the motor 38 starts to rotate. Since a torque at the time the motor 38 starts to rotate is larger than that during the rotating, it is preferred to make ODUTY, which is motor drive speed information, larger, so that a start flag is set to 1. In addition, OPPULS which is the previous lens movement information, is set to 0 and a variable BAWAI is set to 15. The OPPULS is the number of pulses of the photo-interrupter which correspond to the movement of the taking lens 39. The BAWAI is a value of operating speed information divided by an edge width of the two-phase pulses into sixteen cases. When the value is 0, it represents a maximum speed and becomes reduced as the value increases, so that when it is 15, it represents a minimum speed.

Thus, when motor drive information is set by a first edge of pulses produced in the pulse generator 32, after interruption of the photo-interrupter is permitted, KUDO is set as a motor drive signal and the motor actually starts to rotate. Rechecking the initial flag, when it is 0, whether a direction of driving the motor 38 is in a direction of bumping to the end is checked. If not, the start flag is checked. As the start flag is 1 at the time the driving is started, the ODUTY which is motor drive speed information is made a duty for starting and the KUDO is made a motor drive signal corresponding to a direction flag. When the taking lens 39 is not in its end position, MPULS is checked.

The MPULS is a variable representing a rotating speed of the operating member 31 and is the number of pulses which are counted in every loop between ①—① during a time interval corresponding to an edge width of one of the two-phase pulses which are produced by operation of the operating member 31. The MULS is initially set to 0 in the subroutine <HEN II>. Accordingly, thereafter, 1 is added to the MPULS and a timer of ODUTY time is started, whereby the subroutine <HEN II> is repeated until the ODUTY time elapses. When the ODUTY time elapses, the motor drive circuit is made in a braking state and a timer for (2.6 ms -ODUTY) is started. The subroutine <HEN II> is repeated until time in the timer elapses. When the (2.6 ms -ODUTY) time elapses, the flow returns to ① in the flow <PF> to perform the flow after ①. Thus, operations between ①—① are repeatedly effected. As such, in this embodiment, the motor for power focusing is driven by controlling pulses for driving the DC motor and the pulse driving for 2.6 ms is performed by forming a motor driving time corresponding to the ODUTY and a braking time corresponding to the (2.6 ms -ODUTY) in a software manner. It will be understood that it is possible to easily apply this to other motors such as a stepper motor, ultrasonic motor and the like by converting the motor drive speed information.

Thus, the pulse driving as a period of 2.6 ms is achieved between ①—① by measuring the time 2.6 ms at the interval from ① to ①. During this, in the loop of the motor driving time other than the measured time from ① to ①, whether the motor driving is completed is checked by the initial flag. When an operating direction is changed, the initial flag becomes 1 in a routine <HEN II> which will be described later, so that the motor drive signal is made brake. In addition, during the motor driving checking is made regarding whether the taking lens 39 is bumping to the end and whether it is the starting time. When the taking lens 39 is driving towards its end and it is actually at the end, the initial flag is made 1 and the motor drive signal is made brake.

Whether the taking lens 39 is at the end is judged by detecting that pulses from the photo-interrupter are not delivered for a time more than 40 ms although the pulse driving is effected with a duty of more than 80%. However, it is possible to easily realize this by providing a switch for detecting that the taking lens is at the end within the taking lens.

The number of looping times for 26 ms in the loop between ①—① is counted by MPULS. When the MPULS reaches 200 or more, the motor drive signal is made brake and the flow returns. Namely, when the operating member 31 is interrupted and when the operating member 31 is operated at a very slow speed, the MPULS counts 200 and more between a first edge to the next edge of pulses delivered by the pulse generator 32 and at this time a braking force is applied to the motor 38 to stop the lens driving.

In the flow <PF>, since interruption of the photo-interrupter is permitted immediately before entering ①, a routine <PHOTO> shown in FIG. 16 is interrupted between ①—① when the motor driving is started.

In the subroutine <PHOTO> shown in FIG. 16 having the function of the lens movement detector 40, the number of pulses from the photo-interrupter in one-to-one correspondence with the lens rotation is counted to drive the motor until motor drive amount information which is previously set by the motor drive information calculator 36 and the number of pulses from the photo-interrupter have a given relationship. MPULS is first checked. When the MPULS is 2 or less the flow returns. When 3 or more, the start flag is checked.

Namely, at the time of starting, since a stop position of the photo-interrupter is scattered, the following flow is made so as not to be performed in the routine <PHOTO> for a time of 5.2 ms.

When the start flag is 1, after the motor drive is made in a braking condition, the flow returns by making the start flag 0 and the initial flag 1. When the start flag is 0, 1 is subtracted from OPPULS. At this time, when no borrow exists, the flow returns and when borrow exists, whether or not PPULS is 0 is checked. Since the OPPULS has been initially set to 0 in the flow <PF>, at this time borrow occurs and the motor is driven by one pulse of the photo-interrupter. The PPULS is the current lens movement information which is set whenever a flow when a pulse edge enters in a routine <HEN II> which will be described later is performed. When the PPULS is set to a given value by this flow, after the PPULS is evacuated to OPPULS and DUTY is evacuated to ODUTY, the PPULS is made 0 and the flow returns. Subtraction of 1 from the evacuated OPPULS is continued until borrow occurs. When borrow occurs and PPULS=0, namely, no edge of the two-phase pulses enters, the flow returns after setting the initial flag to 1 and making the motor drive in a braking condition. When borrow occurs but PPULS≠0, namely, when the next edge enters and PPULS is set in the flow <HEN II>, the PPULS at this time is again evacuated to OPPULS and DUTY is again evacuated to ODUTY and PPULS is made 0, thereby the lens being driven until borrow occurs.

In addition to the description of the ODUTY, operations of DUTY, PPULS, and OPPULS which are essential in the flow <PF> will be described hereinafter in detail.

ODUTY and OPPULS correspond respectively to a duty ratio which is actually driving the motor 38 with pulses and the number of pulses of the photointerrupter in one-to-one correspondence with movement of the taking lens 39. The motor is driven with a duty ratio determined by ODUTY until OPPULS agrees with the number of pulses from the photo-interrupter. Since the operating member 31 is operated independently of rotation of the motor 38, there normally arises the delivery of operating information by operating the operating member 31 even while the number of pulses from the photo-interrupter which correspond to OPPULS enters. Accordingly, while, in this case, drive information is calculated whenever operating information newly enters so that a drive duty ratio and an amount of driving can be changed in accordance with the new drive information, in the second embodiment once OPPULS and ODUTY are set, the motor 38 is driven with a duty determined by ODUTY until the number of pulses from the photo-interrupter agrees with OPPULS. When in agreement, whether operating information is inputted during that time is judged. When being inputted, the drive of the motor 38 is continued in accordance with the drive information based on the latest operating information.

Specifically, an amount of lens movement and a motor drive duty are calculated and set to variables PPULS and DUTY other than OPPULS and ODUTY in response to an operation of the operating member 31. This deals with in a flow diagram subroutine <HEN> which will be described in the following independently of the current motor driving condition and continues to renew to the newest drive information, thereby whether the operating information has been inputted being judged by whether or not PPULS=0 at the time OPPULS agrees with the number of pulses from the photo-interrupter as described above. When having been inputted, PPULS and DUTY are respectively inputted into OPPULS and ODUTY. Accordingly, the motor 38 stops when OPPULS=0, namely, the operating member 31 is not operated while the set OPPULS agrees with the number of pulses from the photo-interrupter.

A subroutine <HEN II> having functions of the operating direction detector 33 to motor drive information calculator 36 will now be described. The subroutine <HEN II>, as shown in FIG. 15, first checks whether two-phase pulses from the pulse generator 32 have edges. When no edge, the flow returns and the subsequent flow is not conducted until an edge is detected. When an edge of the two-phase pulses is detected, whether the operating member 31 is operated in a direction different from that in the previous operation is checked. When an operating direction is changed, a direction flag is inverted, an initial flag is set to 1 in order to stop the motor, an edge flag is set to 1 and ENPULS which is operating amount information is set to 0. However, when MPULS is less than 1, namely, when an operating direction is changed within 2.6 ms, the flow returns without inverting the direction flag, judging that chattering occurs. With such operations, even though the pulse generator 32 is liable to produce a waveform including much chattering due to fatigue and deterioration thereof, it is possible to prevent a lens driving direction from being reversed by chattering.

When an operating direction is not changed, the detection can be made even at a high speed less than 2.6 ms. In this case, after the direction flag is corrected to the same direction, an edge flag is checked. Since the edge flag has been set to 1 at the beginning of entering the flow <PF>, the edge flag is made 0 in this case. After returned, however, the edge flag is set to 1 when the flow reenters from the flow <PF> to the flow <HEN II> and the flow returns. As such, the alternation of the edge flag to 1 and 0 is to allow the following flow to be performed by viewing an edge of one of the two-phase pulses. Specifically, since the CPU does not distinguish between pulses of the two-phase pulses when detecting each of the two-phase pulses, in order to be detectable an edge width of only one of the two-phase pulses, the CPU alternately takes in edges which are delivered by the edge flag and determines DUTY and PPULS based on the edge width.

When the edge flag is 1, making the edge flag 0 and an initial flag 0, the following calculation is performed. When calculating, MPULS corresponding to the edge width to be used in the calculation is shifted to OMPULS and the calculation is performed based on OMPULS. In order to count a time until the next edge occurs, after MPULS is cleared, the direction flag is checked and motor driving information is set to KUDO in response to the direction flag. Namely, when the direction flag is 1, a motor driving-out signal is set to KUDO and when 0, a motor driving-in signal is set to KUDO. Thereafter, an in flag is checked. Just entering the flow <PF>, only a first edge is detected and the in flag is 0. At this time, since a speed can not be detected, the in flag is made 1 and the flow returns. Accordingly, since the in flag is 1 on and after the second edge, in the flow diagram subroutine <HEN II>, after the in flag is checked, BAWAI is entered into OBAWAI in order to calculate a motor driving amount at a high speed from a time interval between two edges. A divided value of OMPULS is entered into BAWAI and a value corresponding to the BAWAI is entered into DUTY.

Now, a calculating formula of a rotating speed of the motor, for example, as shown in the following can be considered.

$$DUTY = (aNs+b)(1-e^{-\omega/c})+d \qquad (1)$$

where a, b, e and d are constants and the maximum speed (the maximum value of DUTY=aNs+b+d) is in proportion to an operating amount Ns of the operating member 31 and a motor speed uniformly increases with an increase of an operating speed (MPULS) $\omega$s to converge to the maximum speed.

In the embodiment, the above formula is calculated with reference to data without resorting to a numerical calculation. Specifically, in the formula (1), assuming a=0, an operating speed $\omega$ is divided into sixteen cases whose number is inputted into BAWAI and a duty of the pulse driving which is operating speed information is inputted into DUTY with reference to data making BAWAI a part of address.

Subsequently, when BAWAI>13, ENPULS which is operating amount information is set to 0. At the beginning of operation or at the time of fine adjustment, since BAWAI is 15 or 14, at this time after ENPULS is set to 0 and a lens driving amount corresponding to BAWAI for fine adjustment is obtained with reference to a first data table (not shown) and is inputted into PPULS, the flow returns after adding 1 to ENPULS. When BAWAI is 13 or less, a lens driving amount corresponding to BAWAI for fine adjustment is obtained with reference to the first data table to be inputted into PPULS as long as ENPULS is not increased to 3 or more.

When INPULS is 3 or more, ENPULS is further checked regarding whether it is 5 or less. When 5 or less, after a lens driving amount corresponding to BAWAI for a low speed is obtained with reference to a second data table (stored in the CPU) and is inputted into PPULS, the flow returns after adding 1 to ENPULS. When ENPULS is 6 or more, after the average of a lens driving amount corresponding to BAWAI for a high speed and that corresponding to OBAWAI for a high speed is determined with reference to a third data table (stored in the CPU) and is inputted into PPULS the flow returns after adding 1 to ENPULS.

Further, the following formula can be considered to calculate a motor driving amount.

$$Nm = (aNs+b)(1-e^{-\omega s2/c})+d \qquad (2)$$

where a, b, c and d are constants and the maximum driving amount (the maximum value of Nm=aNs+b+d) is in proportion to an operating amount (ENPULS)Ns of the operating member 31 and a motor driving amount Nm increases uniformly with an increase of an operating speed $\omega$s to converge to the maximum driving amount. In the embodiment, as described above, an operating amount is divided into three cases and the calculation is performed with reference to data making BAWAI a part of the addresses in each case. When ENPULS$\leq$2 and 3$\leq$ENPULS$\leq$5, a motor driving amount is reduced so as to be able to easily perform the fine adjustment. When ENPULS$\geq$6, in order to make the motor driving smooth the average of lens driving amounts corresponding to the present and the previous BAWAIs is obtained to make a driving amount to be actually controlled.

As described above, a motor driving amount is determined by an operating speed and amount of the operating member 31. When focusing, after the operating member 31 has been quickly rotated to the neighborhood of an in-focus position, fine adjustment is started after the operating member 31 is once stopped, by rotating at a very slow speed or with a change in the rotating direction. At this time, since BAWAI exceeds 13, ENPULS become 0 and the motor driving amount becomes for fine adjustment.

It is noted that a smoother operating feeling can be obtained by increasing the number of the divided cases in accordance with a processing speed and the capability of a CPU in use or be calculating the formulas (1) and (2).

In the embodiment, while only lens movement information is fed back, a motor driving duty is easily compensated by calculating an expected value of a time width of pulses from the photo-interrupter while motor driving information is calculated, comparing the expected value with an actual time width of pulses from the photo-interrupter and feeding back to the motor drive controller 37.

In the embodiment, the taking lens 39 can be driven at an increased moving speed and amount with an increased operating speed of the operating member and at a reduced moving speed and amount with a reduced operating speed of the operating member, thus the taking lens 39 being able to be driven very smoothly. In addition, since movement of the taking lens 39 is determined by an operating speed and amount of the operating member 31, the taking lens 39 can be smoothly driven even with a small variation in an operating speed when the operating amount is small during the fine adjustment. Accordingly, it is possible to perform adjustment from coarse to fine with a good operating feeling without straining nerves and being responsive to even a slight change of a finger and hand in speed.

What is claimed is:

1. A power focusing apparatus comprising:
   a lens driving motor for focusing a taking lens; an operating member which is movable by a manual operation;
   pulse generator means for generating pulses in response to movement of said operating member;
   operating speed detector means for detecting the instantaneous operating speed of said operating member on the basis of pulses from said pulse generator means;
   means for determining a control signal to drive the motor in accordance with the detected operating speed; and
   motor control means for controlling the motor driving in response to a control signal from said control signal determining means.

2. A power focusing apparatus according to claim 1 in which
   said operating member comprises a multi-rotatable rotary operating member.

3. A power focusing apparatus according to claim 1 in which said control signal determining means further comprises means for calculating a duty ratio of a motor drive current to deliver it as said control signal.

4. A power focusing apparatus according to claim 1 in which said control signal determining means includes calculator means for calculating an amount of driving the motor in accordance with the detected operating speed.

5. A power focusing apparatus according to claim 1 in which said pulse generator means delivers two-phase pulses and said detector means detects an operating direction of said operating member on the basis of said two-phase pulses to deliver a driving direction to said motor control means.

6. A power focusing apparatus according to claim 5 in which
when a presently detected operating direction is further abruptly changed and then abruptly returned to the said presently detected operating direction,
said pulse generator means includes means responsive to such abrupt change in the operating direction and abrupt return to the operating direction before the abrupt change to disregard the change of the operating direction from said detected operating directions.

7. A lens driving apparatus comprising:
a motor for driving a lens;
an operating member which is movable by a manual operation;
operating speed detector means for detecting an operating speed of said operating member;
means for determining a control signal to drive the motor in accordance with the detected operating speed;
first storage means for storing said control signal;
motor control means for controlling the motor driving in accordance with the control signal stored in said first storage means; and
reset means for repeatedly delivering a storage renewing signal to said first storage means while operating said operating member.

8. A lens driving apparatus according to claim 7 further including means for generating pulses as the operating member moves and said reset means produces a storage renewing signal in response to pulses from said pulse generator means.

9. A lens driving apparatus according to claim 8 in which said first storage means includes a second storage means for storing the control signal as an initial value which has been predetermined and delivers said initial control signal to said motor control means when detecting an initial pulse from said pulse generator means.

10. A lens driving apparatus according to claim 9 in which said initial control signal is provided for driving the motor with a high duty ratio.

11. A lens driving apparatus comprising:
a motor for driving a lens;
an operating member which is movable by a manual operation;
pulse generator means for generating pulses in response to movement of said operating member;
edge detector means for detecting an edge of a pulse from said pulse generator means;
counter means for counting whenever a given time elapses in order to measure an interval between two pulse edges from aid edge detector means;
calculator means for calculating a control signal for driving the motor in accordance with a count value of said counter means when said edge detector means detects a pulse edge; and
motor control means for controlling the motor driving in response to a control signal from said calculator means.

12. A lens driving apparatus comprising:

a motor for driving a lens; an operating member which is movable by a manual operation;
pulse generator means for generating pulses in response to movement of said operating member;
operating speed detector means for detecting an operating speed of said operating member on the basis of pulses from said pulse generator means;
operating amount detector means for detecting an amount of operating said operating member on the basis of pulses from said pulse generator means;
motor driving amount determining means for determining an amount of driving the motor in accordance with said detected operating speed and amount; and
motor drive control means for controlling the motor in response to motor driving amount information from said motor driving amount determining means.

13. A lens driving apparatus according to claim 12 in which said operating member comprises a multi-rotatable rotary operating member.

14. A lens driving apparatus according to claim 12 in which
a value of motor driving amount information in said determining means uniformly increases with an increase in a value of said operating speed information and converges to a maximum value which is substantially in proportion to operating amount information.

15. A lens driving apparatus according to claim 12 in which
said motor driving amount determining means determines said motor driving amount information from the current operating information when a value of said operating speed information is less than a given value and makes the current motor driving amount information by averaging motor driving amount informations which are determined by the latest and the current operating informations when a value of said operating speed information is more than the given value.

16. A lens driving apparatus according the claim 12 in which upon completing the motor driving in accordance with the motor driving amount determined by said determining means, said motor driving amount determining means stops the motor when operating amount information during the motor driving is zero and controls the motor, when not zero, in accordance with motor driving amount information based on the latest operating information.

17. A lens driving apparatus according to claim 12 in which
said motor drive control means controls the motor with a duty ratio determined in accordance with operating speed information from said operating speed detector means.

18. A lens driving apparatus according to claim 12 further including a mechanism for producing pulses in response to movement of the lens and lens movement detector means for detecting feed-back information to said motor drive control means on the basis of the last-mentioned pulses.

19. A lens driving apparatus comprising:
a motor for driving a lens;
an operating member which is movable by a manual operation;
pulse generator means for generating pulses in response to movement of said operating member;

operating speed detector means for detecting an operating speed of said operating member on the basis of pulses from said pulse generator means;
operating amount detector means for detecting an amount of operating said operating member on the basis of pulses from said pulse generator means;
means for storing the detected operating speed and motor driving amount in one-to-one corresponding relationship with each other and delivering motor driving amount information by receiving an output from said operating speed detector means, said storing and delivering means being provided with a plurality of data tables indicating different one-to-one correspondences between operating speeds and motor driving amounts;
data table selecting means for selecting a given data table by an output from said operating amount detector means; and
motor drive control means for controlling the motor on the basis of the motor driving amount information from said output means.

20. A method for driving a taking lens to a focused condition comprising an operating member which is movable by a manual operation and a motor responsive to control signals for moving said taking lens, said method comprising the steps of:
generating two-phase pulses responsive to movement of the operating member;
detecting the pulses generated responsive to the movement of the operating member for determining the operating speed of the operating member;
detecting the amount of operation of the operating member responsive to the pulses generated;
storing the detected operating speed and motor driving amount;
driving the motor according to an initially stored value in a direction responsive to the direction of movement of the movable member;
detecting the movement of the taking lens; recalculating the travelling amount, speed and direction of the operating member;
comparing the newly calculated amounts with the amount moved by the taking lens and braking the lens driving motor when the amounts compared are in agreement.

21. The method of claim 20 further comprising the step of determining the direction of movement of the control member responsive to the two-phase pulses; and
moving the taking lens according to the detected direction.

22. A lens driving apparatus comprising:
a manual operating member for controlling the lens driving;
pulse generator means for generating pulses responsive to the operation of said manual operating member;
controller means operable in a first control mode for detecting an operation status of the manual operating member responsive to pulses from said pulse generator means and for delivering a predetermined control signal responsive to a variation in pulses from said pulse generator means; and
motor means operationally connected to said controller means for driving a lens in response to said control signal.

23. A lens driving apparatus according to claim 22 in which said controller means in normally in a second control mode before operation of the operating member and assumes said first control mode upon detection of a first pulse from said pulse generator means.

24. A lens driving apparatus according to claim 23 in which said controller means includes means for measuring an elapsed time after each pulse from the pulse generator and means for returning the controller means from said first control mode to said second control mode unless an output is delivered from said pulse generator means within a predetermined time period of said elapsed time.

25. A lens driving apparatus according to claim 22 in which said controller means detects and output speed of pulses from said pulse generator means in said first control mode to determine a lens drive amount in accordance with a least the output speed of said pulses.

26. A lens driving apparatus according to claim 22 wherein said controller means includes means for driving said motor means at a predetermined speed and for a predetermined time upon receipt of an initial pulse from said pulse generator means preparatory to change of said controller means to said first control mode.

27. A lens driving apparatus comprising:
an operating member for being manually operated;
pulse generator means for generating at least one pulse upon operation of said operating member;
detector means for detecting an operating direction of said operating member in response to an output from said pulse generator means;
means for determining a drive signal in response to outputs from said pulse generator means and said direction detector means;
output means for delivering a motor stop signal by detecting the fact that the operating direction of the operating member has varied during the operation on the basis of an output from said direction detection detector means;
storage means for storing said drive signal and including means for storing said motor stop signal in preference to said drive signal when said motor stop signal is generated;
output means for repeatedly delivering a storage renewal signal to said storage means during operation of said operating member; and
motor means for driving a lens by being operated on the basis of a stored value in said storage means.

28. A lens driving apparatus according to claim 27 in which said motor stop signal output means includes means to allow said storage means to store a motor stop signal for a given time period.

29. A lens driving apparatus according to claim 27 in which said motor stop signal output means includes means to allow said storage means to store a motor stop signal until the next pulse is produced from said pulse generator means.

30. A lens driving apparatus according to claim 27 including means responsive to said motor stop signal for braking by short-circuiting said motor means.

31. A lens driving apparatus according to claim 30 wherein said motor braking means applies a short circuit to said motor means.

32. A lens driving apparatus according to claim 27 in which said drive signal determining means determines a drive signal in response to at least a pulse speed from said pulse generator means.

33. A lens driving apparatus for a lens movable over a predetermined range comprising:
an operating member for being manually operated;

pulse generator means for generating pulses responsive to operation of said operating member;

means for determining a motor drive signal in response to pulses from said pulse generator means;

end detector means for detecting that said lens has reached either of the opposite ends of the range of lens movement;

output means for delivering a motor stop signal in response to an output from said end detector means;

storage means for storing said drive signal and including means for storing said motor stop signal in preference to said drive signal when said stop signal is delivered;

output means for repeatedly delivering a storage renewal signal to said storage means during operation of said operating member; and a lens drive motor for driving said lens by being operated on the basis of a stored value in said storage means.

34. A lens driving apparatus according to claim 33 in which said end detector means includes means to detect that said lens has reached an end position responsive to halt of lens movement when said drive signal is present.

35. A lens driving apparatus according to claim 33 in which said motor stop signal output means includes means to allow said storage means to store a motor stop signal for a given time period.

36. A lens driving apparatus according to claim 33 in which said motor stop signal output means includes means to allow said storage means to store a motor stop signal until the next pulse is produced from said pulse generator means.

37. A lens driving apparatus according to claim 33 including means responsive to said motor stop signal for braking said motor means.

38. A lens driving apparatus according to claim 33 in which said drive signal determining means determine a drive signal in response to at least a pulse speed from said pulse generator means.

39. A method for driving a taking lens to a desired position in an apparatus comprising an operating member operable by a manual operation, a CPU for providing a control signal corresponding to an operating signal developed by the operating member and a motor for driving the taking lens in response to a control signal from the CPU, said method comprising the steps of:

maintaining during a first mode a stand-by condition during which no control signal is developed;

developing, during said stand by condition, an interruption state upon manual operation of the operating member;

switching from said first mode to said second mode upon development of said interruption state;

continuously detecting, during said second mode the operating condition of said operating member and developing a control signal responsive to the operating signal developed by said operating member;

operating said motor according to at least one characteristic of said control signal; and switching the operating mode from said second mode to said first mode when said operating member is not operated for a predetermined time period.

40. The method of claim 39 in which the step of continuously detecting the operating condition of said operating member further comprises the step of determining the operating speed of said operating member; and the step of controlling said motor comprises developing a motor drive speed responsive to the operating speed of the operating member when in said second mode.

* * * * *

UNITED STATES PATENT AND TRADEMARK OFFICE
CERTIFICATE OF CORRECTION

PATENT NO. : 4,851,869
DATED : July 25, 1989
INVENTOR(S) : Ishimaru et al.

It is certified that error appears in the above-identified patent and that said Letters Patent is hereby corrected as shown below:

```
Column 2, line 34, "FIG." should be --FIGS.--
Column 2, line 35, "operation" should be --operations--
Column 3, line 44, "conductor" should be --conductors--
Column 4, line 52, delete "a" (first occurrence)
Column 4, line 53, "power" should be --a ⟨POWERON⟩ --
Column 5, line 54, "DPULS" should be --PPULS--
Column 6, line 17, delete "the" (1st occurrence)
Column 10, line 1, "MULS" should be --MPULS--
Column 10, line 24, "① to ①" should be --② to ①--
Column 10, line 26, "① to ①" should be --① to ②--
Column 13, line 9, the equation should read:
        DUTY = ($\omega$Ns+b)(1-$e^{-\omega s/c}$)+d
Column 13, line 19, "$\omega$" should be --$\omega s$--
Column 13, line 37, "INPULS" should be --ENPULS--
Column 14, line 11, "become" should be --becomes--
Column 15, line 60, "aid" should be --said--

Column 6, line 17, "the" should be --The--.
```

Signed and Sealed this

Ninth Day of April, 1991

Attest:

HARRY F. MANBECK, JR.

Attesting Officer

Commissioner of Patents and Trademarks